United States Patent
Lee et al.

(10) Patent No.: US 11,498,507 B2
(45) Date of Patent: Nov. 15, 2022

(54) AIRBAG MODULE TO PROTECT DISPLAY DEVICE OF VEHICLE

(71) Applicant: HYUNDAI MOBIS CO., LTD, Seoul (KR)

(72) Inventors: Seok Min Lee, Yongin-si (KR); Ga Ram Jeong, Yongin-si (KR); Do Hyoung Kim, Yongin-si (KR); Kyu Sang Lee, Yongin-si (KR); Min June Song, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/359,473

(22) Filed: Jun. 25, 2021

(65) Prior Publication Data

US 2022/0024402 A1    Jan. 27, 2022

(30) Foreign Application Priority Data

Jul. 21, 2020    (KR) .......................... 10-2020-0090583

(51) Int. Cl.
    *B60R 21/205*    (2011.01)
    *B60R 21/215*    (2011.01)
    *B60R 21/217*    (2011.01)
    *B60R 21/16*     (2006.01)

(52) U.S. Cl.
    CPC .......... *B60R 21/205* (2013.01); *B60R 21/215* (2013.01); *B60R 21/217* (2013.01); *B60R 2021/161* (2013.01); *B60R 2021/2173* (2013.01)

(58) Field of Classification Search
    CPC ... B60R 21/205; B60R 21/215; B60R 21/217; B60R 2011/0082; B60R 2011/0005; B60R 11/0229; B60R 11/0235; B60R 11/0258; B60R 11/0264; B60R 2021/2173; B60R 2021/161
    USPC .............................................. 280/728.2, 732
    See application file for complete search history.

(56) References Cited

U.S. PATENT DOCUMENTS

| | | | | |
|---|---|---|---|---|
| 5,360,231 A | * | 11/1994 | Adams | B60R 21/2165 280/732 |
| 6,733,033 B2 | * | 5/2004 | Muller | B60R 21/205 280/732 |
| 9,221,418 B1 | * | 12/2015 | Pline | B60R 21/2155 |
| 2003/0151238 A1 | * | 8/2003 | Woolley | B60R 21/2155 280/732 |

FOREIGN PATENT DOCUMENTS

| | | | | |
|---|---|---|---|---|
| DE | 102004040409 A1 | * | 3/2006 | ........... B60R 21/205 |
| DE | 19757437 B4 | * | 5/2008 | ........... B60R 21/205 |
| DE | 102016219071 A1 | * | 4/2018 | ........... B60R 21/205 |
| KR | 10-2016-0051130 | | 5/2016 | |

* cited by examiner

*Primary Examiner* — Keith J Frisby
(74) *Attorney, Agent, or Firm* — DLA Piper LLP (US)

(57) ABSTRACT

An airbag module to protect a display device of a vehicle is proposed. The airbag module includes: the display device vertically slidably mounted to a cockpit of the vehicle; and an airbag housing arranged at the rear of the display device, rotatably mounted to the cockpit on a shaft extended in a direction parallel to a transverse direction of the vehicle, and configured to be rotated in response to sliding of the display device.

11 Claims, 6 Drawing Sheets

AIRBAG MODULE TO PROTECT DISPLAY DEVICE OF VEHICLE

CROSS REFERENCE TO RELATED APPLICATION

The present application claims priority to Korean Patent Application No. 10-2020-0090583, filed Jul. 21, 2020, the entire contents of which is incorporated herein for all purposes by this reference.

BACKGROUND OF THE INVENTION

Field of the Invention

The present invention relates generally to an airbag module to protect a display device of a vehicle.

Description of the Related Art

In general, vehicles have airbag devices for protecting passengers by supplying gas from an inflator during a collision and expanding an airbag.

The airbag devices are installed at various portions in each vehicle as necessary. The airbag devices such as a driver seat airbag device mounted to a steering wheel to protect a driver in a driver seat, a passenger seat airbag device mounted to an upper side of a glove compartment to protect a passenger in a passenger seat, and a curtain airbag device mounted along a roof rail to protect the side areas of a passenger.

In an autonomous vehicle, the steering wheel of the vehicle is hidden or removed from the interior of the vehicle, and only a display device to control the vehicle exists in a cockpit.

When a front airbag provided to protect the front of the passenger by being expanded from a portion between the cockpit and a windshield is expanded, the front airbag hits the display device located at the cockpit to cause dislodging or damage to the display device.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to protect a display device from an airbag cushion expanded at the rear of the display device mounted to a cockpit of a vehicle.

An airbag module to protect a display device of a vehicle includes: the display device vertically slidably mounted to a cockpit of the vehicle; and an airbag housing arranged at the rear of the display device, and mounted to the cockpit rotatably on a shaft extended in a direction parallel to a transverse direction of the vehicle, and configured to be rotated in response to sliding of the display device.

The airbag module may include: a side bracket coupling both side surfaces of the airbag housing to the cockpit to allow the airbag housing to be rotated.

The airbag module may include: a connection link having a first end connected to the display device and a second end connected to the airbag housing, so that the airbag housing may be rotated when the display device is moved vertically.

The connection link may include: a first link having a first end connected to the display device, and configured to be moved in response to the vertical sliding of the display device; a rotation part rotatably coupled to the cockpit, and connected to a second end of the first link, and configured to be rotated when the first link is moved; and a second link having a first end connected to the airbag housing and a second end connected to the rotation part, and configured to be moved in response to rotation of the second end thereof to rotate the airbag housing.

The airbag module may include: an airbag cushion mounted to the airbag housing and configured to be expanded toward the front of a passenger during a collision of the vehicle; and a flap mounted to the airbag housing with the airbag cushion, configured to be extended toward an upper side of a display cover at the same time with expansion of the airbag cushion, and configured to guide the expansion of the airbag cushion.

The airbag module may include: the display cover having a first side rotatably coupled to the cockpit and a second side configured to be rotated on the first side when the display device is vertically moved while the second side is in contact with an upper portion of the display device, wherein the airbag cushion may be configured to be expanded toward the front of the passenger from a portion between a windshield of the cockpit and the display cover.

The flap may have a first end coupled to an airbag cover of the airbag housing, and configured such that a second end thereof may be extended toward the display device as the airbag cover may be opened by an expansion force generated during the expansion of the airbag cushion.

An airbag cover configured to be opened toward the display device and to guide an extension direction of the flap may be provided.

The flap may have a first end coupled to an airbag cover, and extended such that a length between the first end thereof and a second end thereof may be longer than a longitudinal distance of upper end portions of the display device.

The airbag module may include: a first driving device configured to allow the display device to vertically slide.

The airbag module may include: a second driving device connected to the airbag housing and configured to rotate the airbag housing.

As described above, the airbag module to protect the display device of a vehicle according to the present invention is configured to be rotated such that an upper surface of the airbag housing faces upward when the display device slides upward. Accordingly, the airbag cushion can be expanded toward the upper side of the display device, and the display device can be protected.

When the display device slides downward to be located inside the cockpit, the airbag module is rotated such that the upper surface of the airbag housing faces the passenger. Accordingly, the airbag cushion can be rapidly expanded toward the front of the passenger and reduce a risk of injuries to the passenger.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
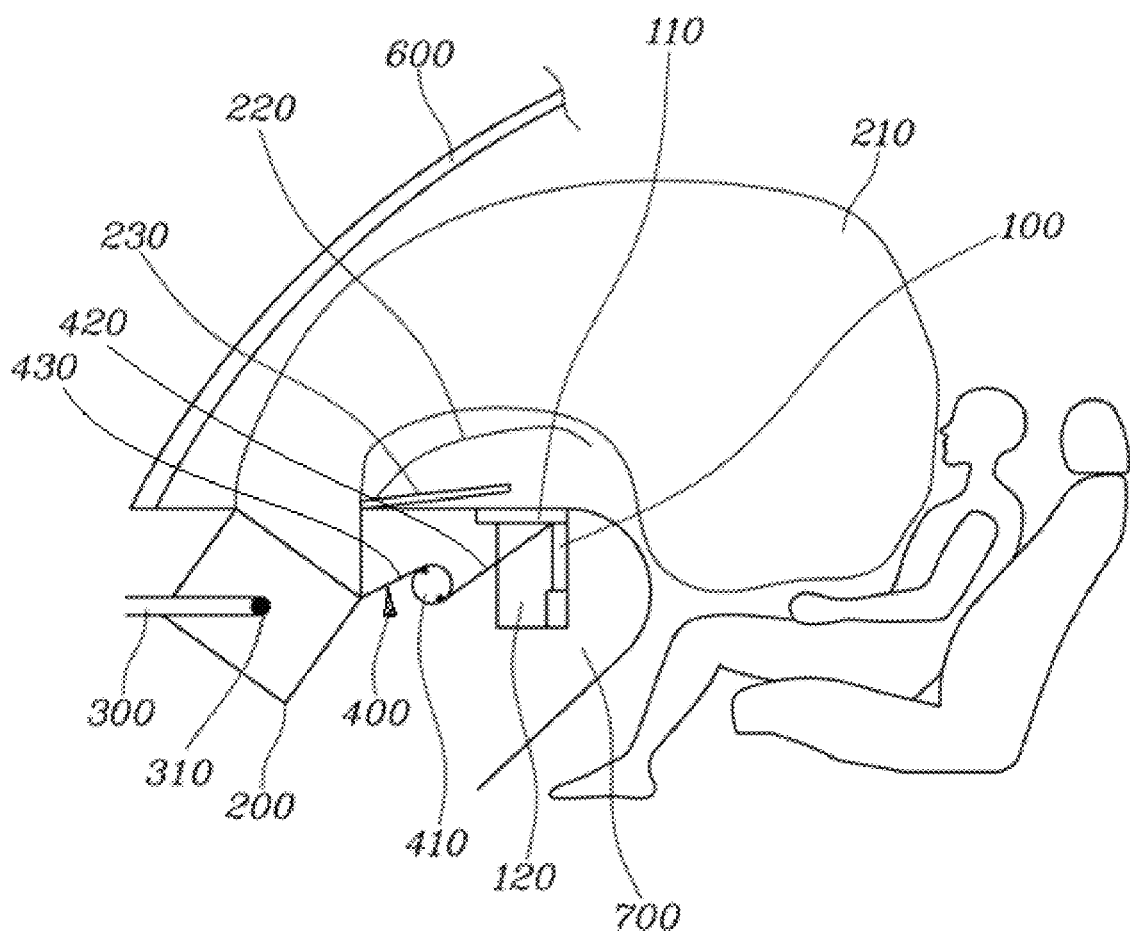
FIG. 1 is a side view showing expansion of an airbag cushion when the display device is moved downward, in a first embodiment of an airbag module to protect a vehicle display device according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Hereinbelow, an airbag module to protect a display module of a vehicle according to exemplary embodiments of the present invention will be described with reference to accompanying FIGS. 1 to 6.

A display module of a vehicle according to the present invention may be applied to an autonomous vehicle. After a steering wheel is removed from the front of a driver seat, a display device 100 may be mounted to a cockpit 700 or the display device 100 may be mounted to a cockpit 700 in front of a passenger seat. The airbag module may be mounted at the rear of the display device 100, and the display module of a vehicle according to the present invention is developed in order to prevent the display device 100 from being broken and scattered due to expansion of the airbag module.

Figure 2:
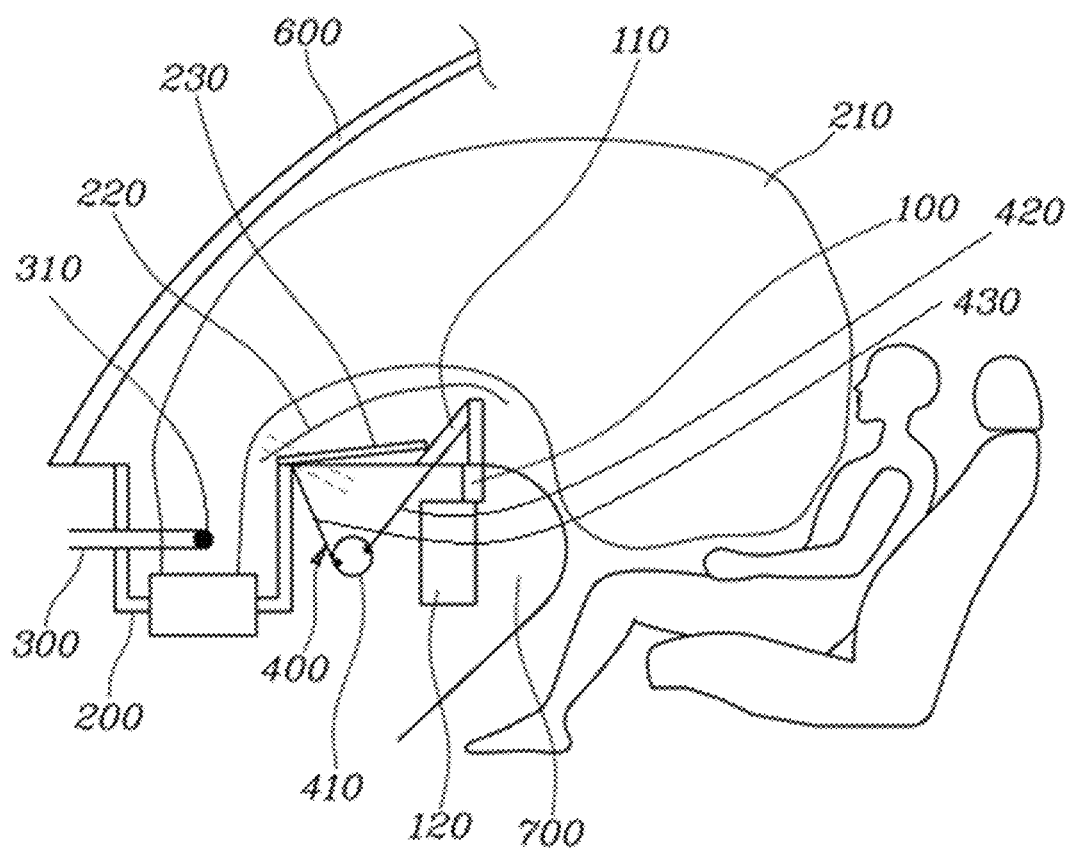
FIG. 2 is a side view showing expansion of the airbag cushion when the display device is moved upward, in the first embodiment of the airbag module to protect the vehicle display device according to the embodiment of the present invention.

FIG. 1 is a side view showing expansion of an airbag cushion 210 when the display device 100 is moved downward, in a first embodiment of the airbag module to protect the display device 100 according to the embodiment of the present invention. FIG. 2 is a side view showing expansion of the airbag cushion 210 when the display device 100 is move upward in the first embodiment of the airbag module to protect the display device 100 according to the embodiment of the present invention.

According to the present invention, the airbag module to protect the vehicle display device 100 includes: the display device 100 vertically slidably mounted to the cockpit 700 of the vehicle; and an airbag housing 200 arranged at the rear of the display device 100, rotatably mounted to the cockpit 700 on a shaft 310 extended in a direction parallel to a transverse direction of the vehicle, and configured to be rotated in response to sliding of the display device 100.

The display device 100 is mounted to the cockpit 700, and configured to be located inside the cockpit 700 when not in use and to slide upward when in use to move the display device out of the inside of the cockpit 700.

The cockpit 700 means dashboards located at the front of a driver seat and a passenger seat. The display device 100 is mounted to the cockpit 700 and located in front of a passenger, and the airbag housing 200 is mounted to a portion at the rear of the display device inside the cockpit. Therefore, the display device may be located at the front of the passenger when the airbag cushion 210 is expanded.

The airbag housing 200 is rotated in response to the vertical sliding of the display device 100, and the airbag housing 200 is rotated toward the passenger when the display device 100 slides downward to be located inside the cockpit 700 so that the airbag cushion 210 may be expanded quickly.

Accordingly, it is possible to reduce injuries to the passenger during a collision of the vehicle.

When the display device 100 slides upward to be located at an upper portion of the cockpit, the airbag housing 200 is rotated such that an upper surface thereof faces an upper portion of the display device. When the airbag cushion 210 is expanded, the airbag cushion 210 is expanded to the upper portion of the display device 100, so that the airbag cushion 210 may be expanded without hitting the rear portion of the display device 100.

Whereby, it is possible to protect the display device 100 when the display device 100 is located at the upper portion of the cockpit.

The airbag module includes: a side bracket 300 coupling both side surfaces of the airbag housing 200 to the cockpit 700, so that the airbag housing 200 is rotated.

The side bracket 300 is rotatably coupled to both the side surfaces of the airbag housing 200, so that the airbag housing 200 may be rotated on the shaft 310 parallel to the transverse direction of the vehicle in response to the sliding of the display device 100.

Therefore, the airbag housing 200 mounted in the cockpit 700 may be freely rotated.

The airbag module includes: a connection link 400 having a first end connected to the airbag housing 200 and a second end connected to the display device 100 to allow the airbag housing 200 to be rotated when the display device 100 is moved vertically.

The connection link 400 having the first end connected to a first side of the airbag housing 200 and the second end connected to the display device 100 may rotate the airbag housing 200 as the display device 100 is moved vertically.

When the display device 100 slides upward, the connection link 400 rotates the airbag housing 200 so that the upper surface of the airbag housing 200 faces upward. When the display device 100 slides downward, the connection link 400 rotates the airbag housing 200 so that the upper surface of the airbag housing 200 faces the passenger.

The airbag cushion 210 is expanded while an airbag cover 230 located at the upper surface of the airbag housing 200 is opened, and when the display device 100 slides downward to be located inside the cockpit 700, the upper surface of the airbag housing 200 faces the passenger and the airbag cushion 210 may be expanded to the front of the passenger.

Accordingly, the airbag cushion 210 may be rapidly expanded.

The connection link 400 includes: a first link 420 having a first end connected to the display device 100, and moved in response to the vertical sliding of the display device 100; a rotation part 410 rotatably coupled to the cockpit, connected to a second end of the first link 420, and configured to be rotated when the first link 420 is moved; and a second link 430 having a first end connected to the airbag housing 200 and a second end connected to the rotation part 410, and configured to be moved in response to rotation of the rotation part 410 to rotate the airbag housing 200.

The first link 420 has the first end connected to the display device 100 and is moved as the display device 100 slides vertically. The first link 420 has the second end connected to the rotation part 410 so that the rotation part 410 may be rotated in response to the movement of the first link 420.

The second link 430 has the first end connected to the airbag housing 200 and the second end connected to the rotation part 410. When the rotation part 410 is rotated, the second link 430 is moved to change the linear movement of the display device 100 to the rotational movement of the airbag housing 200.

The first link 420 or the second link 430 may be formed in the form of a belt or a wire, and may be moved to move the rotation part 410 or be moved by the rotation of the rotation part 410.

Therefore, the airbag housing 200 may be rotated in conjunction with the display device 100, and manufacturing costs thereof may be reduced since the airbag housing 200 may be rotated without a separate motor for rotating the airbag housing 200.

The airbag module includes: the airbag cushion 210 mounted to the airbag housing 200 and expanded toward the front of the passenger during a collision of the vehicle; and a flap 220 mounted to the airbag housing 200 with the airbag cushion 210, configured to be expanded toward an upper side of a display cover 110 at the same time with the expansion of the airbag cushion 210, and configured to guide the expansion of the airbag cushion 210.

The airbag cushion 210 may be mounted in the airbag housing 200 and may be expanded toward the front of the passenger during a collision of the vehicle to protect the front surface of the passenger. The flap 220 is coupled to the airbag cover 230 of the airbag housing 200 to allow the airbag cover 230 to be opened toward the display device 100, and the flap 220 is extended toward an upper side of the display device 100 and may guide the airbag cushion 210, so that the airbag cushion 210 may be expanded toward the upper side of the display device 100 without hitting a rear portion of the display device 100.

Therefore, it is possible to prevent the display device 100 from being broken or flying due to an expansion force of the airbag cushion 210.

The airbag module includes: the display cover 110 having a first side rotatably coupled to the cockpit 700 and a second side configured to be rotated on the first side thereof while being in contact with an upper portion of the display device 100 when the display device 100 is vertically moved. The airbag cushion 210 is configured to be expanded toward the front of the passenger from a portion between a windshield 600 of the cockpit 700 and the display cover 110.

The display cover 110 has the first side rotatably coupled to the cockpit 700 and the second side thereof in contact with the upper portion of the display device 100, thereby being rotated in response to the vertical sliding of the display device 100. The display cover 110 is located at the rear of the display device 100 and may protect the display device 100 from the expansion of the airbag cushion 210.

The flap 220 has the first end connected to the airbag cover 230 of the airbag housing 200, and the second end extended toward the display device 100 as the airbag cover 230 is opened by the expansion force generated when the airbag cushion 210 is expanded.

The airbag cushion 210 is mounted in a state in which the volume in the airbag housing 200 is minimized before the expansion thereof, and may be expanded toward the front of the passenger during a collision of the vehicle.

The flap 220 is coupled to the airbag cover 230 at an upper side of the airbag cushion 210, and when the airbag cushion 210 is expanded, the flap 220 may be extended with the airbag cushion 210 by the expansion force of the airbag cushion 210. During the extension of the flap 220, the flap 220 may be extended toward the upper side of the display device 100 to guide a direction of the expansion of the airbag cushion 210.

Accordingly, during the expansion of the airbag cushion 210, the flap may prevent the airbag cushion 210 from hitting a rear surface of the display device 100 to protect the display device 100.

In addition, the flap 220 may protect the display device 100 doubly with the display cover 110 so that the display device 100 may be further safely protected.

The flap 220 may be made of a material the same as or similar to a material of the airbag cushion 210, and may be moved to be located above the display device 100 during the expansion of the airbag cushion 210 and may be mounted to the airbag housing 200 with a minimized size thereof for the light weight thereof.

As a further embodiment, the flap 220 may be made of a material with the elasticity, and may be extended by the elasticity during the expansion of the airbag cushion 210 to be located above the display device 100. Whereby, the flap 220 may be extended to a precise location.

The airbag cover 230 is opened toward the display device 100 and guides a direction of the extension of the flap 220.

The airbag cover is opened by the expansion force generated when the airbag cushion 210 is expanded, and a hinge portion in which the airbag cover 230 and the airbag housing 200 are connected to each other may be located at the display device 100. Accordingly, the airbag cover 230 may be opened toward the display device 100 during the opening thereof, and as the airbag cover 230 is opened, the flap 220 coupled to the airbag cover is also opened toward the display device 100.

The airbag cover 230 is rotatably coupled to the cockpit 700, and the coupling between the airbag cover 230 and the cockpit 700 may be the hinge coupling or the coupling in which the airbag cover may be folded toward the display device 100.

Whereby, the extension direction of the flap 220 is guided by the opening direction of the airbag cover 230, so that the second end of the flap 220 may face the upper side of the display device 100.

The flap 220 has the first end coupled to the airbag cover 230 and the distance between the first end and the second end of the flap 220 is extended longer than the distance between upper end portions of the display device 100.

The first end of the flap 220 is coupled to a cover at a hinge in which the airbag cover 230 and the airbag housing are coupled to each other, and the flap 220 may be extended to the upper side of the display device 100 as the airbag cushion 210 is expanded.

The coupling between the flap 220 and the airbag cover 230 may be achieved by sewing or a method such as an adhesive.

Therefore, the first end of the flap 220 is solidly coupled to the airbag cover 230, the airbag cover 230 may be opened as the airbag cushion 210 is expanded, and the flap 220 is extended with the opening of the airbag cover 230 so that the second end of the flap may be extended to the upper side of the display device 100.

Figure 5:
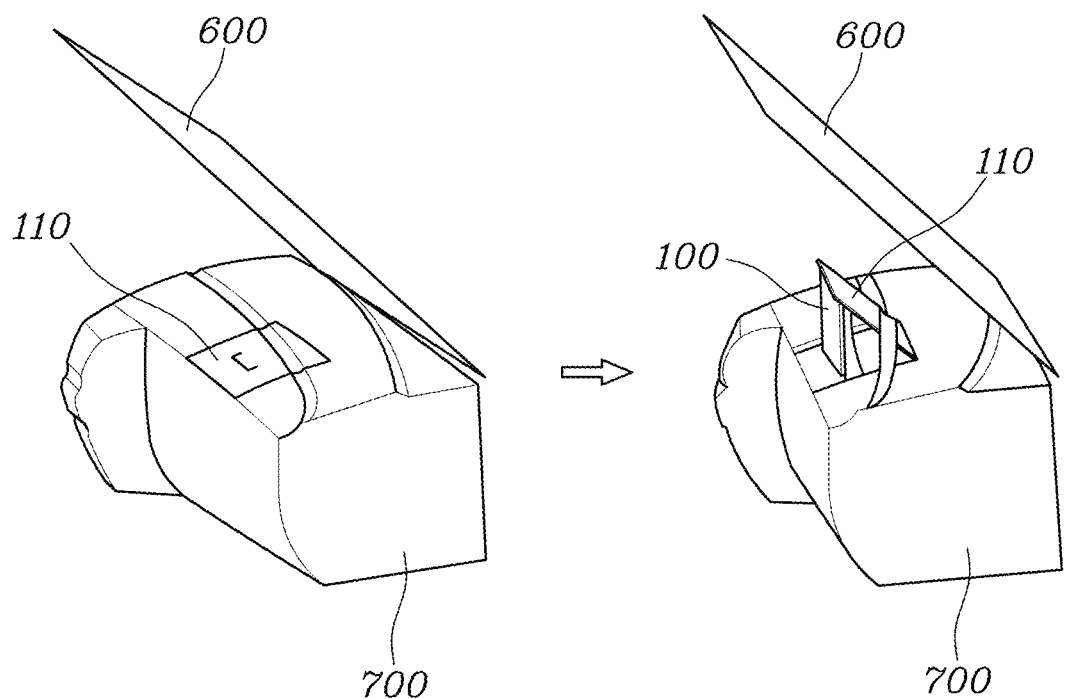
FIG. 5 is a perspective view showing the display device and a display cover of the airbag module to protect the vehicle display device according to the embodiment of the present invention.

FIG. 5 is a perspective view showing the display device 100 and the display cover 110 of the airbag module to protect the display device 100 of a vehicle according to the embodiment of the present invention.

Figure 6:
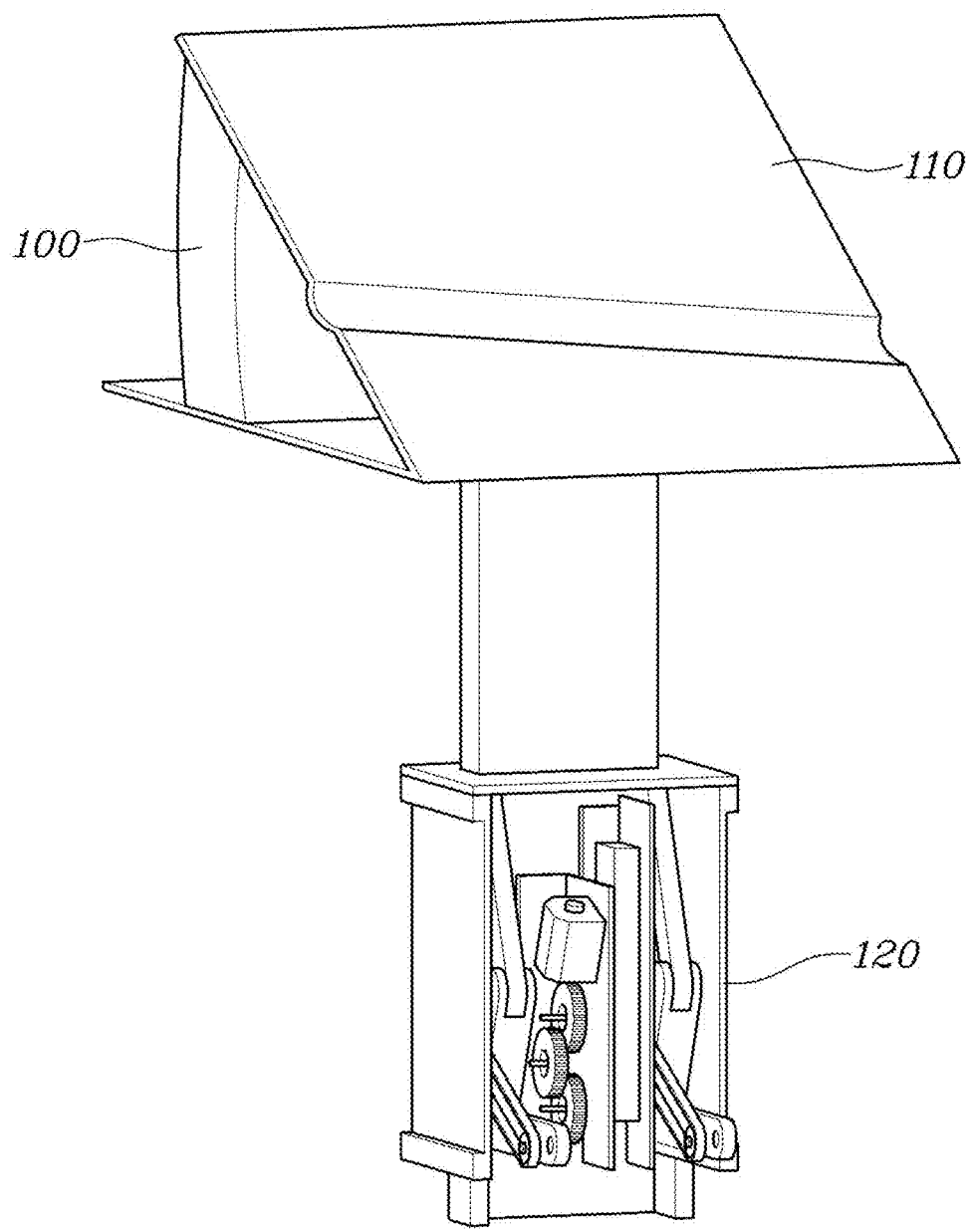
FIG. 6 is a perspective view showing the display device and a first driving device of the airbag module to protect the vehicle display device according to the embodiment of the present invention.

FIG. 6 is a perspective view showing the display device 100 and a first driving device 120 of the airbag module to protect the display device 100 of a vehicle according to the embodiment of the present invention.

The airbag module includes the first driving device 120 configured to move the display device 100 vertically in a sliding manner.

For allowing the vertical sliding of the display device 100, the display device 100 may be connected to the first driving device 120 to slide in the vertical direction.

The first driving device 120 includes an electric motor and a link part. The link part has a first end connected to the electric motor and a second end connected to the display device 100, so that the display device 100 may be slidably moved upward or downward by the rotation of the electric motor.

Accordingly, when the display device 100 is not used, the display device 100 may slide toward the inside of the cockpit 700, and when the display device 100 is used, the display device 100 may slide upward to be located outside the cockpit 700.

Figure 3:
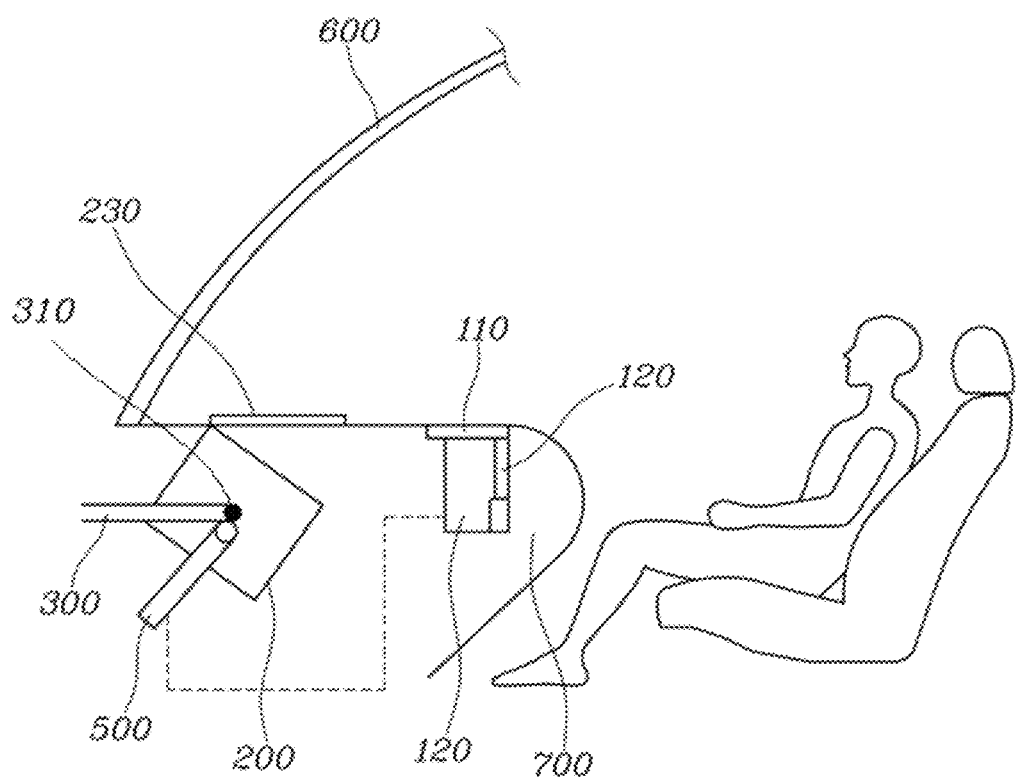
FIG. 3 is a side view showing a second embodiment of the airbag module to protect the vehicle display device according to the embodiment of the present invention.

FIG. 3 is a side view showing a second embodiment of the airbag module to protect the display device 100 of a vehicle according to the embodiment of the present invention.

Figure 4:
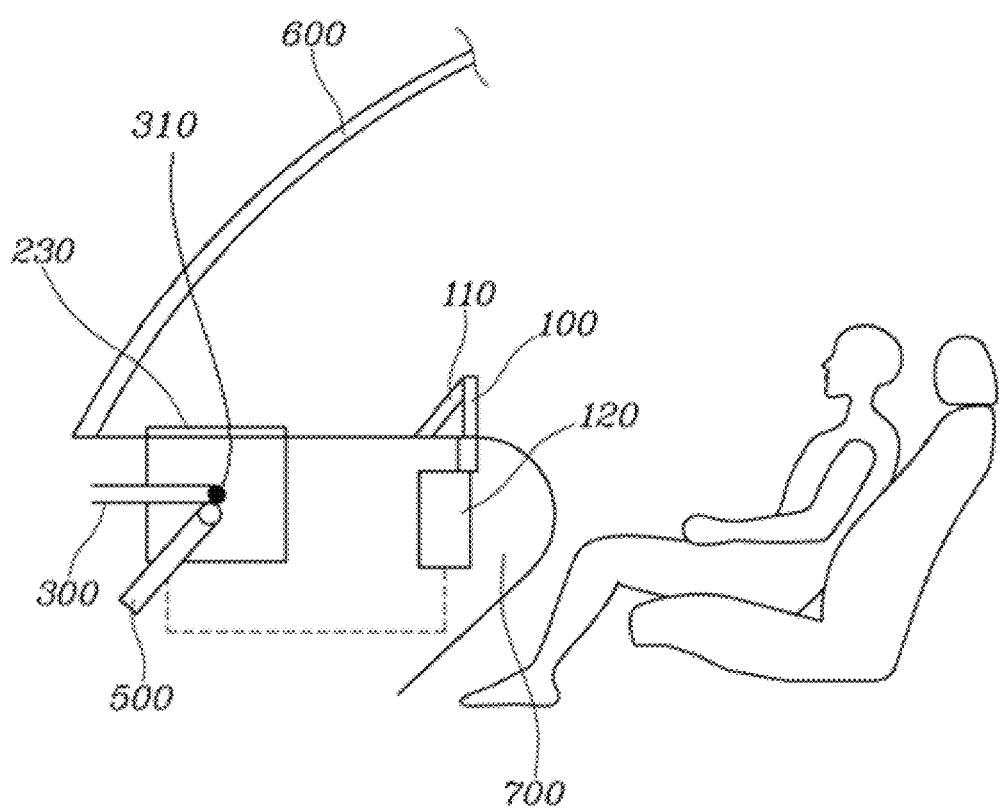
FIG. 4 is a side view showing the airbag module when a display module is moved upward, in the second embodiment of the airbag module to protect the vehicle display device according to the embodiment of the present invention.

FIG. 4 is a side view showing the airbag module when a display module is moved upward, in the second embodiment of the airbag module to protect the display device 100 of a vehicle according to the embodiment of the present invention.

The airbag module includes a second driving device 500 connected to the airbag housing 200 to rotate the airbag housing 200.

The second driving device 500 applies a rotation force to rotate the airbag housing 200, so that the airbag housing 200 may be rotated independently of the sliding of the display device 100.

As the second embodiment of the airbag module to protect the display device 100 of a vehicle according to the present invention, the airbag device is connected to the second driving device 500 electrically connected to the first driving device 120. Accordingly, the airbag housing 200 may be rotated as the first driving device 120 moves the display device 100 vertically in the sliding manner.

In detail, when the first driving device 120 moves the display device 100 upward in the sliding manner, the second driving device 500 rotates the airbag housing 200 to direct an upper surface of the airbag housing 200 upward. When the airbag cushion 210 is expanded, the expansion direction of the airbag cushion 210 is guided by the flap 220 to be expanded toward the upper side of the display device 100, whereby the display device 100 may be protected.

In addition, as shown in FIG. 3, when the display device 100 slides downward and is located in the inside of the cockpit 700, the second driving device 500 rotates the airbag housing 200 toward the passenger, so that the airbag cushion 210 may be rapidly expanded to protect the passenger during a collision of the vehicle. Accordingly, it is possible to reduce injuries to the passenger.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An airbag module comprising:
an airbag housing arranged at the rear of a display device and mounted to a vehicle cockpit rotatably on a shaft extended in a direction parallel to a transverse direction of the vehicle, wherein the airbag housing is configured to rotate in response to a sliding of the display device.

2. The airbag module of claim 1, further comprising:
a side bracket coupling both side surfaces of the airbag housing to the cockpit and configured to allow a rotation of the airbag housing.

3. The airbag module of claim 1, further comprising:
a connection link having a first end connected to the display device and a second end connected to the airbag housing, the connection link configured to allow a rotation of the airbag housing when the display device moves vertically.

4. The airbag module of claim 3, wherein the connection link comprises:
a first link having a first end connected to the display device, and configured to move in response to a vertical sliding of the display device;
a rotation part rotatably coupled to the cockpit, and connected to a second end of the first link, and configured to rotate when the first link moves; and
a second link having a first end connected to the airbag housing and a second end connected to the rotation part, and configured to move in response to rotation of the second end thereof to rotate the airbag housing.

5. The airbag module of claim 1, further comprising:
an airbag cushion mounted to the airbag housing and configured to expand toward the front of a passenger during a collision of the vehicle; and
a flap mounted to the airbag housing with the airbag cushion, and configured to extend toward an upper side of a display cover at the same time with expansion of the airbag cushion, and further configured to guide the expansion of the airbag cushion.

6. The airbag module of claim 5, further comprising:
the display cover having a first side and a second side, wherein the first side is rotatably coupled to the cockpit, and wherein the second side is configured to rotate on the first side when the display device moves vertically while the second side is in contact with an upper portion of the display device,
wherein the airbag cushion is configured to expand toward the front of the passenger from a portion between a windshield of the cockpit and the display cover.

7. The airbag module of claim 5, wherein the flap has a first end and a second end, wherein the first end is coupled to an airbag cover of the airbag housing and configured such that the second end of the flap extends toward the display device as the airbag cover opens by an expansion force generated during the expansion of the airbag cushion.

8. The airbag module of claim 5, further comprising:
an airbag cover configured to open toward the display device and to guide an extension direction of the flap.

9. The airbag module of claim 5, wherein the flap has a first end and a second end, wherein the first end is coupled to an airbag cover and extended such that a length between the first end and the second end is longer than a longitudinal distance of upper end portions of the display device.

10. The airbag module of claim 1, further comprising:
a first driving device configured to allow the display device to slide vertically.

11. The airbag module of claim 1, further comprising:
a second driving device connected to the airbag housing and configured to rotate the airbag housing.

* * * * *